United States Patent
Lo et al.

(10) Patent No.: US 11,852,212 B2
(45) Date of Patent: Dec. 26, 2023

(54) ADJUSTABLE MAGNETIC COUNTERBALANCE

(71) Applicant: Invetech, Inc., San Diego, CA (US)

(72) Inventors: Chris Lo, Newton, MA (US); Mark L'Italien, North Chelmsford, MA (US)

(73) Assignee: Invetech, Inc., San Diego, CA (US)

(*) Notice: Subject to any disclaimer, the term of this patent is extended or adjusted under 35 U.S.C. 154(b) by 772 days.

(21) Appl. No.: 16/855,380

(22) Filed: Apr. 22, 2020

(65) Prior Publication Data

US 2020/0332857 A1     Oct. 22, 2020

Related U.S. Application Data

(60) Provisional application No. 62/836,825, filed on Apr. 22, 2019.

(51) Int. Cl.
*H01F 7/02* (2006.01)
*F16F 15/28* (2006.01)

(52) U.S. Cl.
CPC ............ *F16F 15/28* (2013.01); *H01F 7/02* (2013.01)

(58) Field of Classification Search
CPC ..... H01F 7/0236; H01F 7/0268; F16C 39/063
USPC ........................................................ 335/306
See application file for complete search history.

(56) References Cited

U.S. PATENT DOCUMENTS

| | | | | |
|---|---|---|---|---|
| 5,263,558 A | * | 11/1993 | Yamaoka | F16F 15/03 188/267 |
| 5,542,506 A | * | 8/1996 | McMichael | H02N 15/04 188/267 |
| 5,947,237 A | * | 9/1999 | McMichael | H02N 15/04 188/267 |
| 7,839,041 B2 | * | 11/2010 | Mohler | H02K 37/20 310/156.32 |
| 9,016,446 B2 | * | 4/2015 | Mankame | F16F 6/00 188/267 |
| 9,423,000 B2 | * | 8/2016 | Tan | G01L 19/0061 |

(Continued)

FOREIGN PATENT DOCUMENTS

WO    20180156662    8/2018

OTHER PUBLICATIONS

International Search Report for corresponding application No. PCT/US20/29268 dated Aug. 28, 2020.

(Continued)

*Primary Examiner* — Alexander Talpalatski
(74) *Attorney, Agent, or Firm* — Lerner David LLP

(57) ABSTRACT

An adjustable magnetic counterbalance assembly wherein a counterbalance force of the adjustable magnetic counterbalance is adjustable. The adjustable magnetic counterbalance assembly includes at least one ferromagnetic tube; a magnet disposed in the at least one ferromagnetic tube and configured to be axially movable and wherein the magnet is configured to be rotationally movable relative to the respective at least one ferromagnetic tube; wherein the counterbalance force is configured to be adjustable by adjusting the rotational position between the magnet and a respective ferromagnetic tube to change the polar alignment of the magnet. Alternatively, the adjustable magnetic counterbalance assembly changes the counterbalance force based on the relative alignment of the poles of one magnet to an adjacent one.

18 Claims, 15 Drawing Sheets

(56) References Cited

U.S. PATENT DOCUMENTS

2003/0189383 A1   10/2003   Fremerey

OTHER PUBLICATIONS

R. Bjørk, "Comparison of Adjustable Permanent Magnetic Field Sources," Published in Journal of Magnetism and Magnetic Materials, vol. 322 (22), 3664-3671, 2010.

* cited by examiner

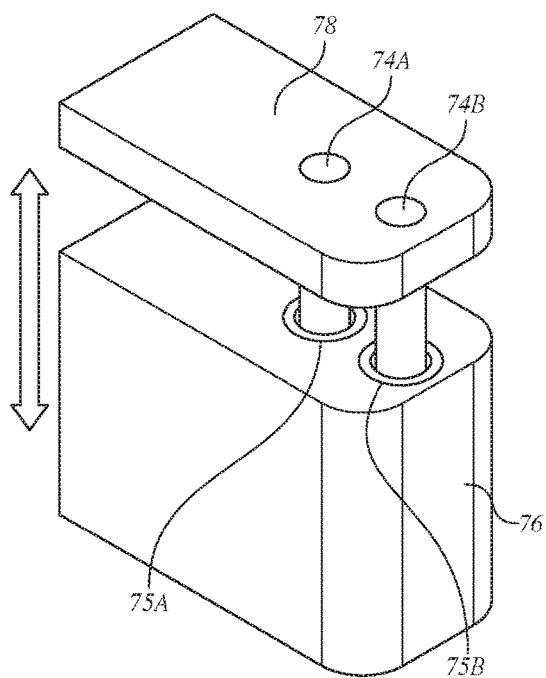
FIG. 12
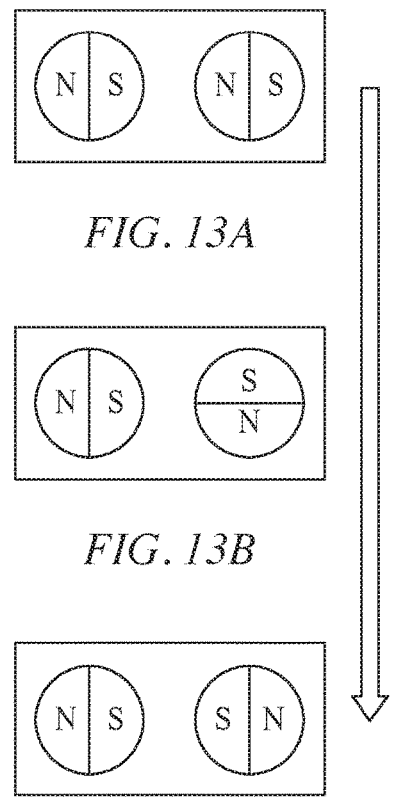
FIG. 13A
FIG. 13B
FIG. 13C

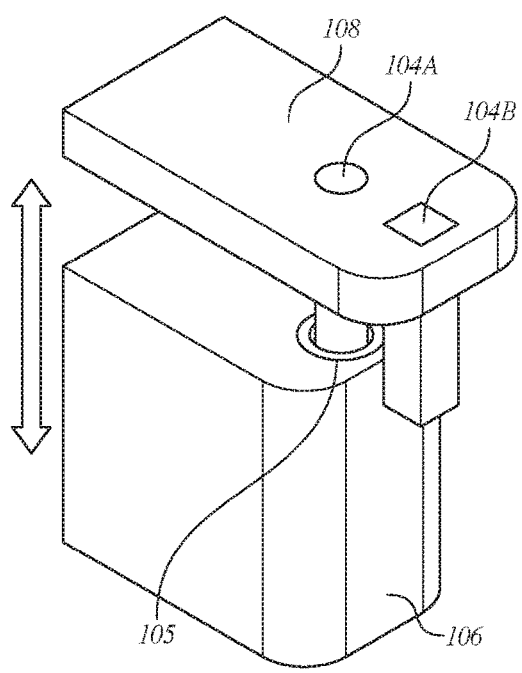
FIG. 16
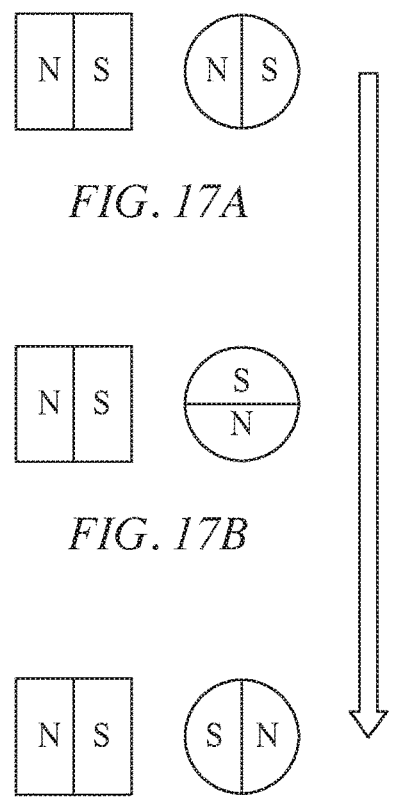
FIG. 17A
FIG. 17B
FIG. 17C

ADJUSTABLE MAGNETIC COUNTERBALANCE

CROSS-REFERENCE TO RELATED APPLICATION

This application claims the benefit of the earlier filing date of U.S. Provisional Patent Application No. 62/836,825 filed on Apr. 22, 2019, the disclosure of which is incorporated by reference herein.

BACKGROUND

Linear motion systems are used to produce precise linear motion along at least one axis of direction. Applications of linear motion systems include any application in which linear motion may be desired. In a typical linear motion system, a moving carriage can be driven (made to move back and forth) with a variety of motors. These can include, for example, piezo actuators, linear motors, rotary motors and screws, rotary motors and belts, and rotary motors and rack and pinion. Generally, linear motion system having a single degree of freedom motion (DOF) include a stage featuring a stationary base and a moving carriage or table. Linear motion stages may be combined to form multi-axis linear motion systems having more than one DOF. For example, a first linear motion stage may provide motion along an x-axis, whereas a second linear motion stage may provide motion along a y-axis that is perpendicular to the x-axis to form a dual-axis linear motion system. Examples of linear motion systems are found in U.S. Pat. Nos. 10,367,436 and 10,374,530 the disclosures of which are incorporated by reference herein. Linear motion stages may be oriented in the vertical direction. Embodiments of the disclosure balance the forces of gravity on linear stages (when oriented in the vertical direction) using a magnetic counter balance.

BRIEF DESCRIPTION OF THE DRAWINGS

Various embodiments of the disclosure are described herein in by way of example in conjunction with the following figures, wherein like reference characters including those increased by multiples of ten may designate the same or similar elements.

FIG. 12 shows a perspective view of a stage having and adjustable magnetic counterbalance assembly according to another embodiment.

FIGS. 13A-13C show possible positions of the magnets within the adjustable magnetic counterbalance assembly of FIG. 12.

FIG. 16 shows a perspective view of a stage having and adjustable magnetic counterbalance assembly according to another embodiment.

FIGS. 17A-17C show possible positions of the magnets within the adjustable magnetic counterbalance assembly of FIG. 16.

DETAILED DESCRIPTION

Figure 1:
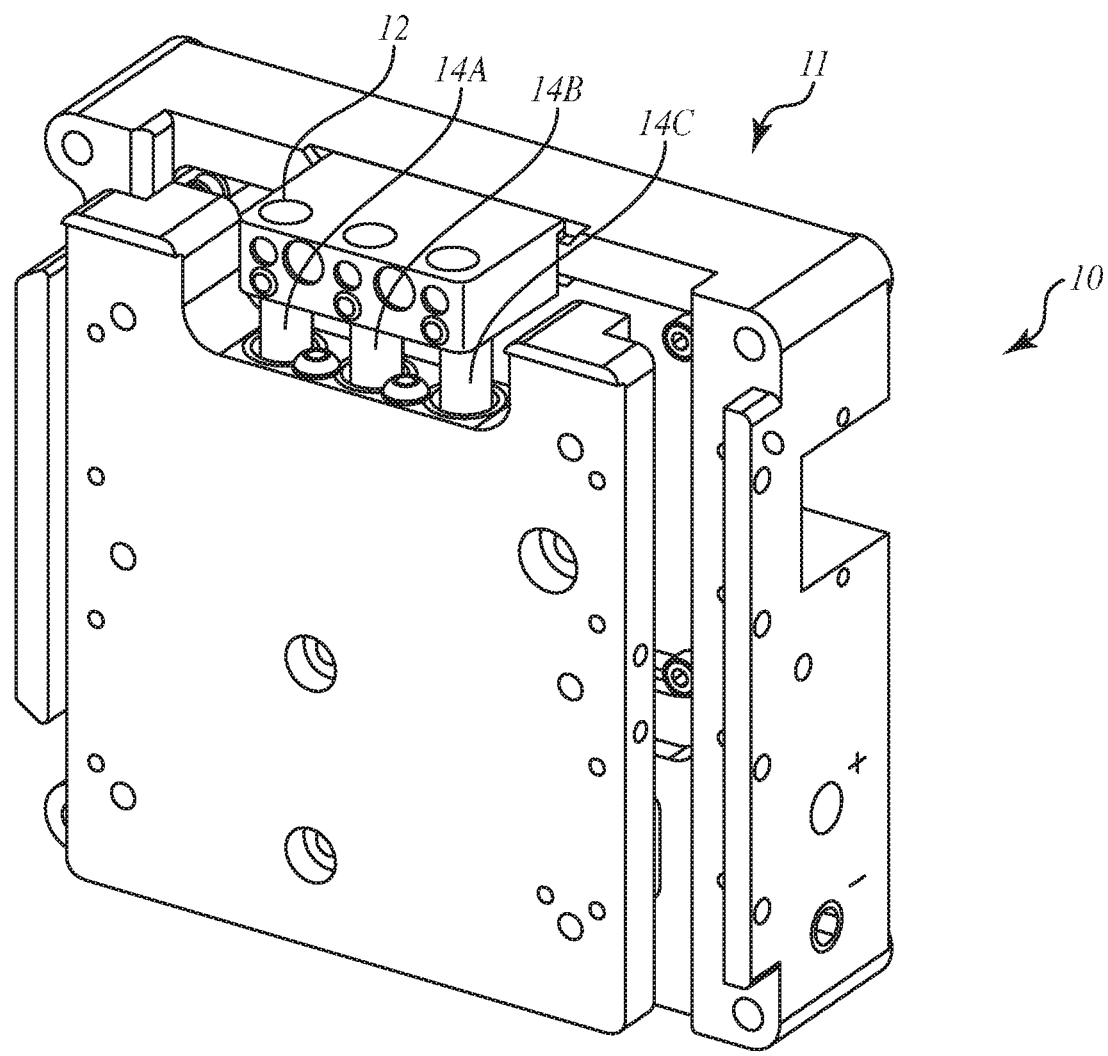
FIG. 1. shows a top view of a stage having an adjustable magnetic counterbalance assembly according to embodiments of the invention.

In a magnetic counter balance a cylindrical magnet that is polarized N→S across the diameter (as opposed to along the axis) is arranged so that it can move within a ferromagnetic steel tube along a linear axis at various positions. The magnet is attracted to the tube and if it is only constrained concentrically it will pull itself completely into the tube and center itself within the tube thereby equalizing the forces in all directions. By centering and constraining the tube and magnet with a linear axis a counterbalance can be achieved with a nearly constant linear force. The force is consistent because the tube only influences the magnet field a small distance away—that is if a magnet is engaged in the tube that is long enough such that the magnet does not come too close to the ends of the tube. Other than magnet size and strength, the amount of counterbalance force is controlled by adjusting the clearance between the magnet and tube (the gap) and the wall thickness of the tube. When a system is designed for users, the users identify their desired payload and the size of the counterbalance is designed accordingly.

Factors that impact the consistency of the counterbalance force over the length of travel are concentricity of the magnet to the tube, charging consistency of the magnet over the full length of the magnet, size variation of the magnet over the full length of the magnet, and size variation of the tube over the full length of travel of the axis.

Factors that impact the stage to stage counterbalance force variation (manufacturing build consistency) of the design are primarily component variations—magnet to magnet charge variation, magnet to magnet size variation, tube to tube inner diameter (ID) variation, tube to tube wall thickness variation, and assembly variations. Embodiments presented here intend to enable adjustment for these typical build variations.

Other tangible benefits include cost savings and inventory minimization. With the wide variation of counterbalance force adjustment, it is also possible to remove the machining of the ID of the tube to save cost. It is also possible to reduce the quantity of tubes that are stocked to account for the full range of counterbalance force values.

When a counterbalance is sized perfectly and has a perfectly consistent force over the length of travel the payload will float vertically in every position without any power. When it is not sized perfectly the system needs to apply power to keep the payload in a fixed position. The power required to hold the system in a fixed position results in heat introduced into the system—this is not desirable in high precision equipment.

In designing a system for a user one also needs to consider what will happen when a power outage happens. In some instances, the counterbalance needs to be sized such that the payload moves upward to a safe position and in other instances the counterbalance needs to be sized such that the payload moves downward to a safe position. The sizing of the counterbalance force needs to take into account any errors in build consistency as well as any errors in force consistency over the length of travel to insure that the user's payload will move to the safe position in a power outage situation. This means there will always need to be some undesirable power and heat introduced into the system.

Embodiments of the disclosures include a single or multiple magnet adjustable counter balance for a linear motion system.

With the use of the adjustable counterbalance greater than 50% of the inconsistencies can be eliminated and therefore greater than 50% of the unnecessary power/heat can also be eliminated.

In some instances, a user will have numerous devices that they will mount to their stage and this will cause variation to the overall payload. In the past this has been addressed by using a block of weight that the user can add and remove from the system whenever they are changing their devices. This approach means that the system needs to be tuned for the largest possible mass and sized for the largest counterbalance force. When tuning for the largest mass and sizing for the largest counterbalance the performance attributes of the stage (acceleration, deceleration and settling time) are reduced. The use of an adjustable counterbalance with established fixed positions can allow a user to make the adjustment and therefore utilize the ideal tuning parameters for each desired configuration.

Embodiments of the disclosure include an adjustable counterbalance magnet which changes the counterbalance force based on the relative alignment of the poles of one magnet to an adjacent one. This is achieved by changing the relative rotation or the distance between two adjacent magnets. Alternatively, the increase of force of the counterbalance can be achieved with a magnet within a single slotted ferromagnetic tube wherein the relative rotational position of the magnet and tube is adjustable. In this alternative embodiment, the counterbalance force may be adjusted by the rotation of the magnetic poles of the magnet in relation to the slots (or other shaped cutouts) in the ferromagnetic tube. Multiple parallel tubes or magnets are not required for this embodiment.

Referring to FIG. 1, a DOF stage 10 includes a counterbalance magnet assembly 11 that allows for the orientation of three magnets 14A, 14B, 14C supported by a bracket 12 for counterbalance force variation. This stage was used for testing. The results are in Table 1 below.

Figure 2A:
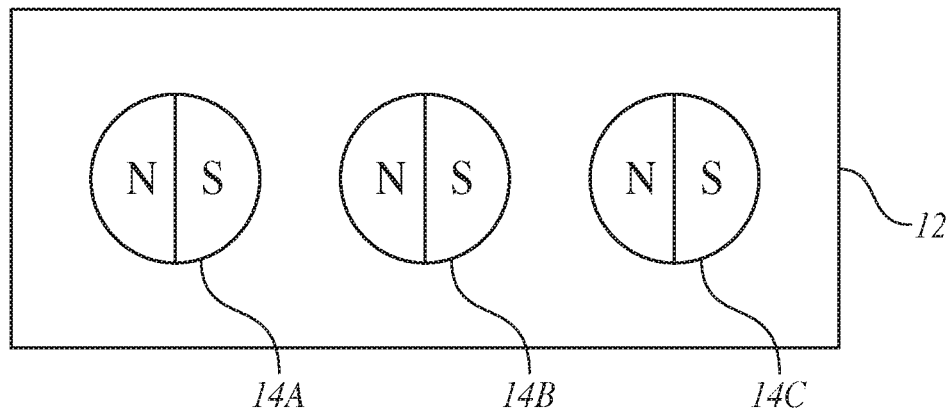
FIGS. 2A-2C show possible positions of the magnets within the stage of FIG. 1.

Referring to FIG. 2A, a magnet orientation is shown showing three magnets 14A, 14B, 14C oriented so that their poles are attracted to each other. This assembly approach has typically led to the most consistent counterbalance force across multiple stages and batches of materials. This is the intended starting point for magnet orientation prior to any adjustments.

Figure 2B:
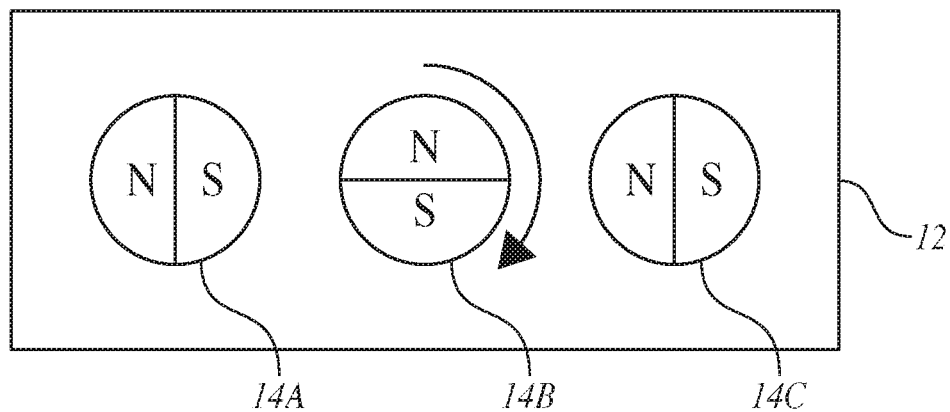

Referring to FIG. 2B, the center magnet 14B is rotated 90 degrees to increase the counterbalance force.

Figure 2C:
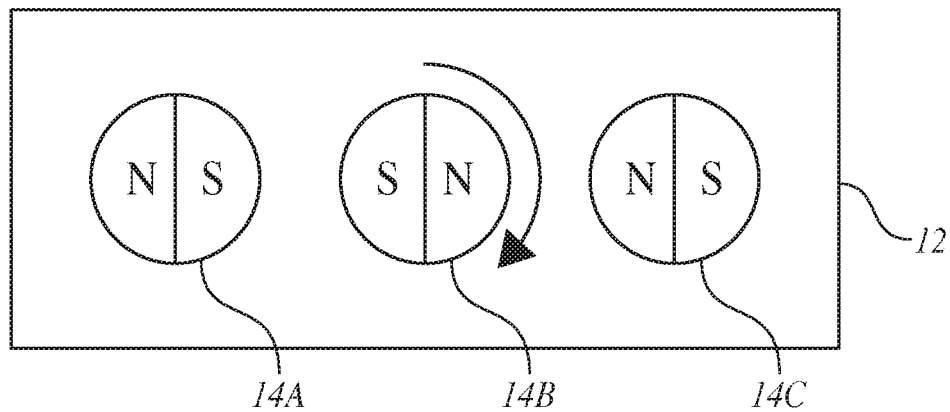

Referring to FIG. 2C, the center magnet 14B is rotated 180 degrees to increase the counterbalance force.

With the DOF stage assembled and using the same magnets and ferromagnetic steel tubes, adjustments were made to qualify the overall counterbalance force as well as the linearity over the full range of travel.

TABLE 1

| Center Magnet Orientation | Minimum Force (Top) | Maximum Force (Bottom) |
| --- | --- | --- |
| 0 Degrees | .500 kg | .600 kg |
| 90 degrees | .625 kg | .725 kg |
| 180 degrees | .725 kg | .825 kg |

This demonstrated that the counterbalance force could be increased by 50% without any negative impact on the consistency over the full travel range.

This principle can be applied to counterbalance designs that use more than one magnet if the magnets are in proximity to each other such that their magnetic fields interact. The principle is that when the magnetic poles oppose each other (bucking) the magnetic field is projected further outward such that more of the magnet outside of the counterbalance tube can influence the overall counterbalance force.

Figure 3:
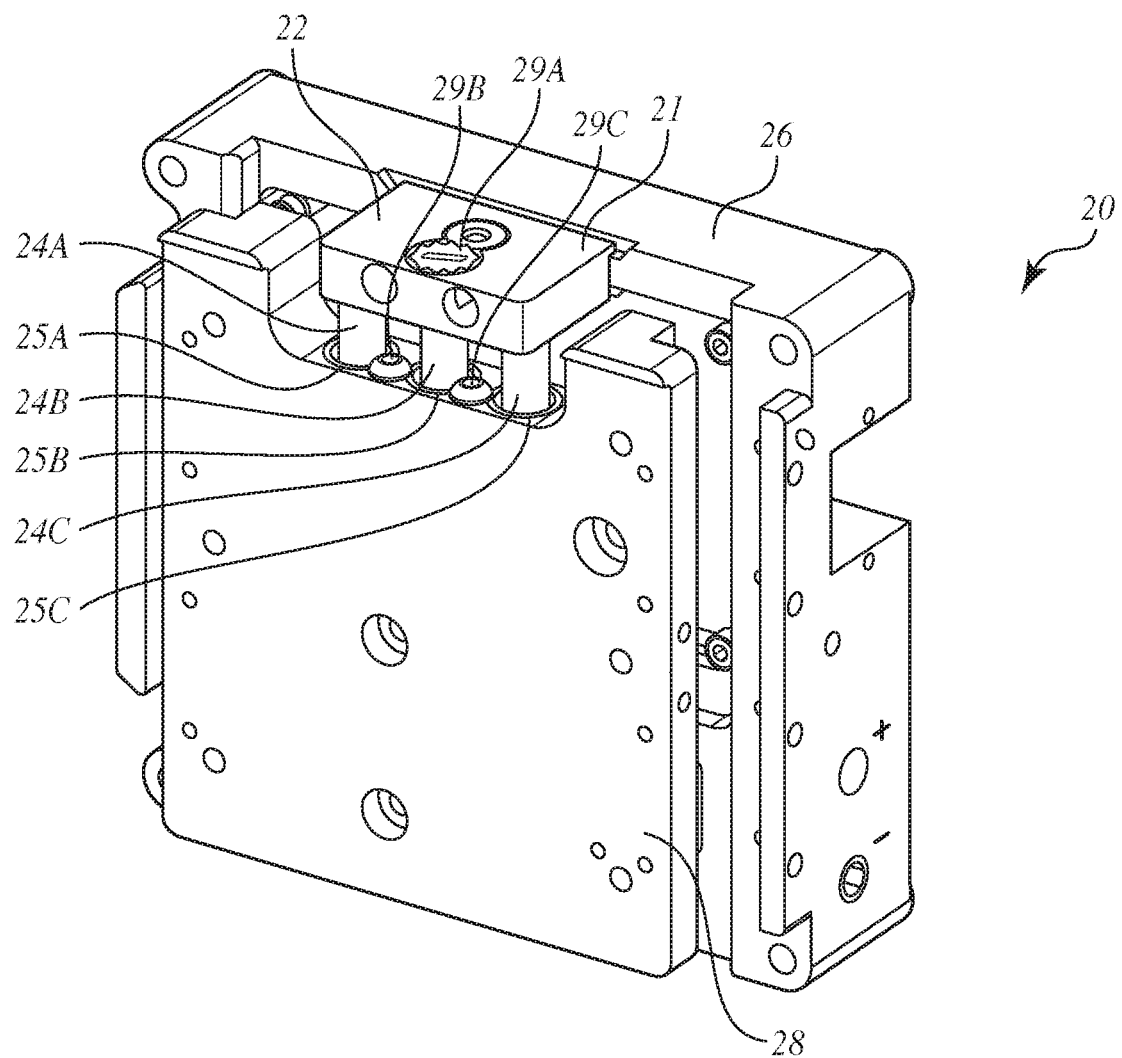
FIG. 3 shows a perspective view of a stage having an adjustable magnetic counterbalance assembly according to embodiments of the invention.

Referring to FIG. 3, a DOF stage 20 is shown having a mounting base 26 and a moving table 28 on which the user payload is assembled. DOF stage 20 further includes a counterbalance magnet assembly 21 including a counterbalance bracket 22 attached to mounting base having three magnets 24A, 24B, 24C allowing for the adjustment of the center magnet 24B. Magnets 24A, 24B and 24C are each disposed in ferromagnetic steel tubes 25A, 25B, 25C that are inserted into the moving table 28 and each of magnets 24A, 24B, and 24C are axially moveable with respect to their respective tube. In this embodiment, the center magnet 24B is able to be rotated in order to adjust the relative alignment of the poles of center magnet 24B to an adjacent magnet 24A, 24C. Counterbalance bracket 22 includes a manually adjustable rotational adjustment mechanism such as a screw assembly 29A which is used to rotate center magnet 24B within tube 25B. Screws 29B, 29C, or other locking mechanisms, are used to lock ferromagnetic tubes 25A, 25B, 25C in place to moving table 28. If this were to be employed on a stage where the user desired to dynamically adjust this for different uses, markings (not shown) are applied to enable the user to repeat their adjustments repeatedly.

Figure 4:
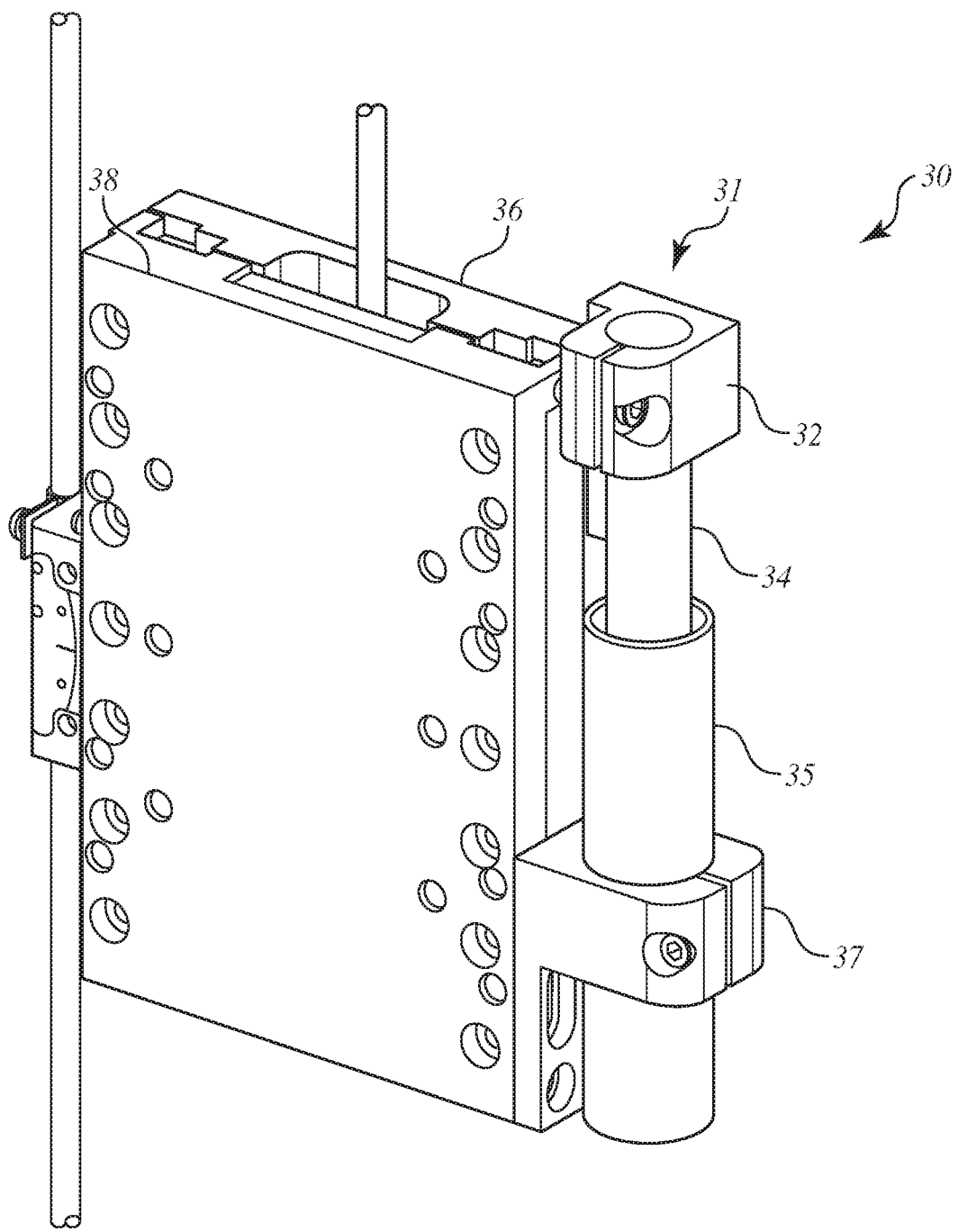
FIG. 4 shows a perspective view of a conventional miniature linear stage having a non-adjustable magnetic counterbalance assembly.

Referring to FIG. 4, a conventional miniature linear stage 30 is shown configured for operation in a vertical orientation. Stage 30 is shown having a mounting base 36 and a moving table 38. Stage 30 further includes a counterbalance magnet assembly 31 including a counterbalance bracket 32 attached to mounting base 36 supporting a single magnet 34 disposed in a single ferromagnetic tube 35 mounted to tube mount bracket 37 attached to moving table 38. Tube 35 is axially movable with respect to magnet 34 as moving table 38 moves relative to mounting base 36. Magnet 34 is axially movable with respect to tube 35 as moving table 38 moves relative to mounting base 36. In this single magnet counterbalance embodiment, the polar orientation of magnet 34 (polarized N→S across the diameter) cannot be altered with respect to another magnet to impact adjustability so another concept is required to achieve adjustability. In this embodiment, the variables that are used to control the force of the counterbalance are typically the magnet gap and the wall thickness of the tube.

Figure 5:
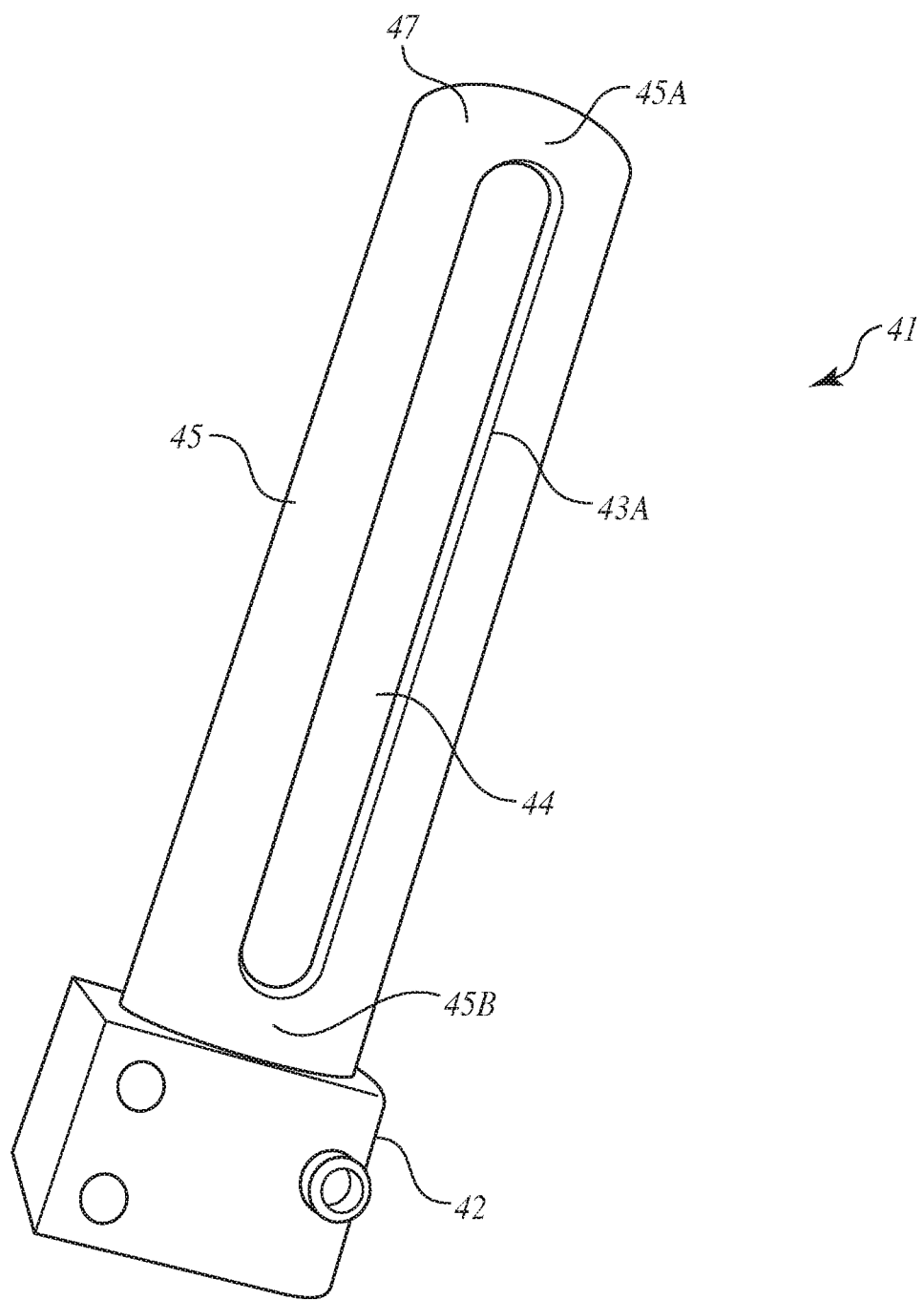
FIG. 5 shows a perspective view of an-adjustable magnetic counterbalance assembly according to embodiments of the invention.

Referring to FIG. 5, a single magnet counter balance assembly 41 is shown in which the relative orientation of the magnet is adjustable according to embodiments of the invention. As shown in FIG. 5, tube 45 has a pair of diametrically opposed longitudinal slots 43A, 43B (only 43A is shown in FIG. 5) and material ties 45A, 45B at either end of tube 45. Tube 45 is rotatable relative to magnet 44 such that the positions of the poles of magnet 44 are adjustable relative to slots 43A, 43B of tube 45 by, for example, manually adjusting the rotational position of tube 45 or magnet 44 relative to one another.

Figure 6A:
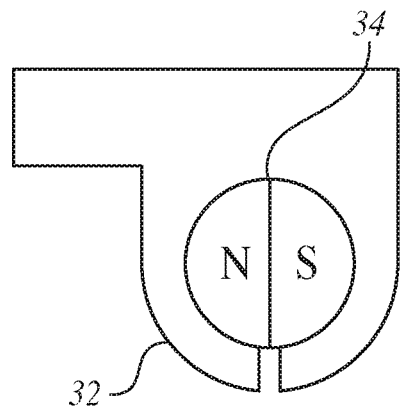
FIG. 6A show the position of the magnet within the stage of FIG. 4.

Referring to FIG. 6A, the conventional mount approach for the magnet mount for the stage of FIG. 4 is shown. The magnet 34 is always oriented orthogonal (relative to the polarization direction) on the stage such that there is a consistent orientation for all stages that are built.

Figure 6B:
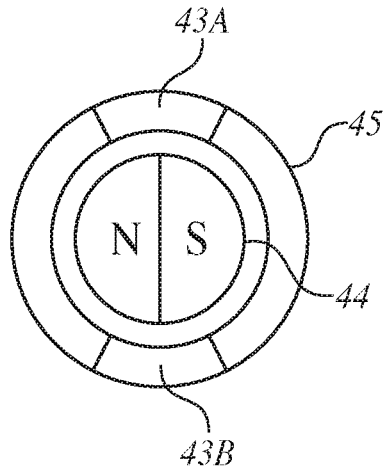
FIGS. 6B-6C show possible positions of the magnet within the adjustable magnetic counterbalance assembly of FIG. 5.
Figure 6C:
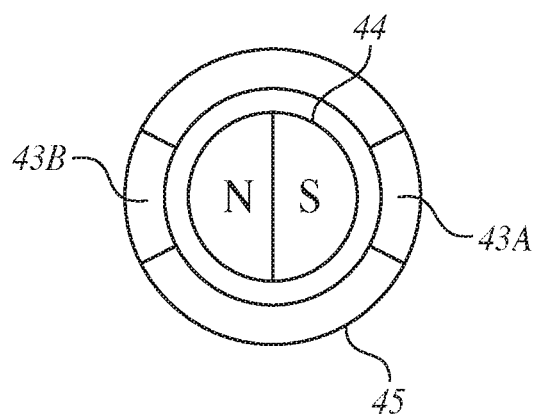

Referring to FIGS. 6B and 6C, two different adjusted orientations for tube 45 for the stage of FIG. 5 are shown.

FIG. 6B shows the poles of magnet 44 facing the metal (solid, non-slotted portions) of tube 45—this is the orientation for the lowest counterbalance force.

FIG. 6C shows the poles of magnet 44 facing the slots 43—this is the orientation for the highest counterbalance force.

The positions of slots 43A, 43B of tube 45 are shown in FIGS. 6B and 6C are oriented 90 degrees away from each other. The counterbalance force varies throughout the 90-degree range of tube 45 rotation.

Figure 7:
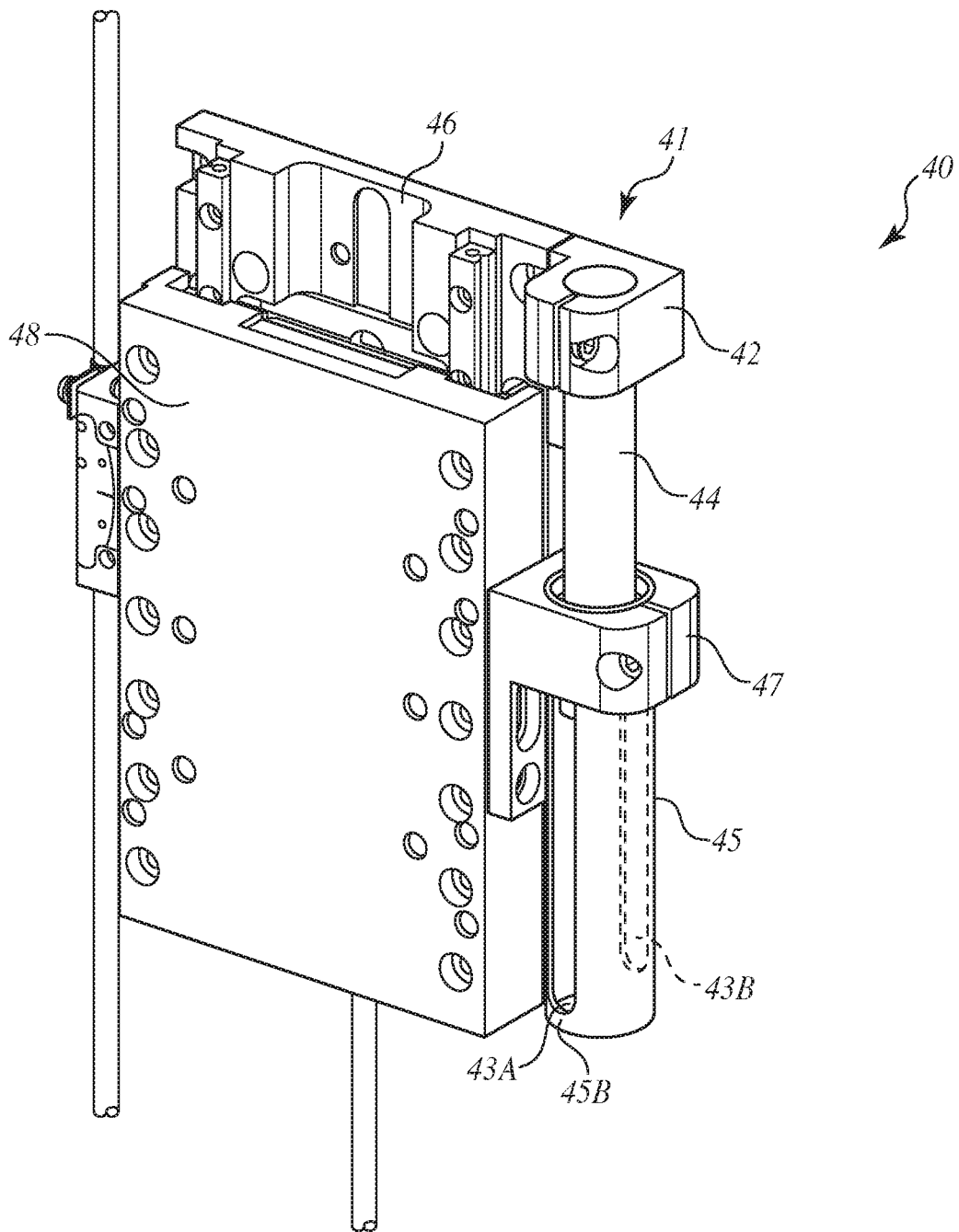
FIG. 7 shows a perspective view of a miniature linear stage having an-adjustable magnetic counterbalance assembly according to embodiments of the invention.

Referring to FIG. 7, the adjustable single magnet counter balance assembly 41 mounted to a stage 40 is shown. Stage 40 is shown having a mounting base 46 and a moving table 48. Stage 40 further includes a counterbalance magnet assembly 41 including a counterbalance bracket 42 attached to mounting base 46 having a single magnet 44 disposed in a single ferromagnetic tube 45 mounted to tube mount bracket 47 attached to moving table 48. Tube 45 has a pair of diametrically opposed longitudinal slots 43A, 43B.

Figure 8:
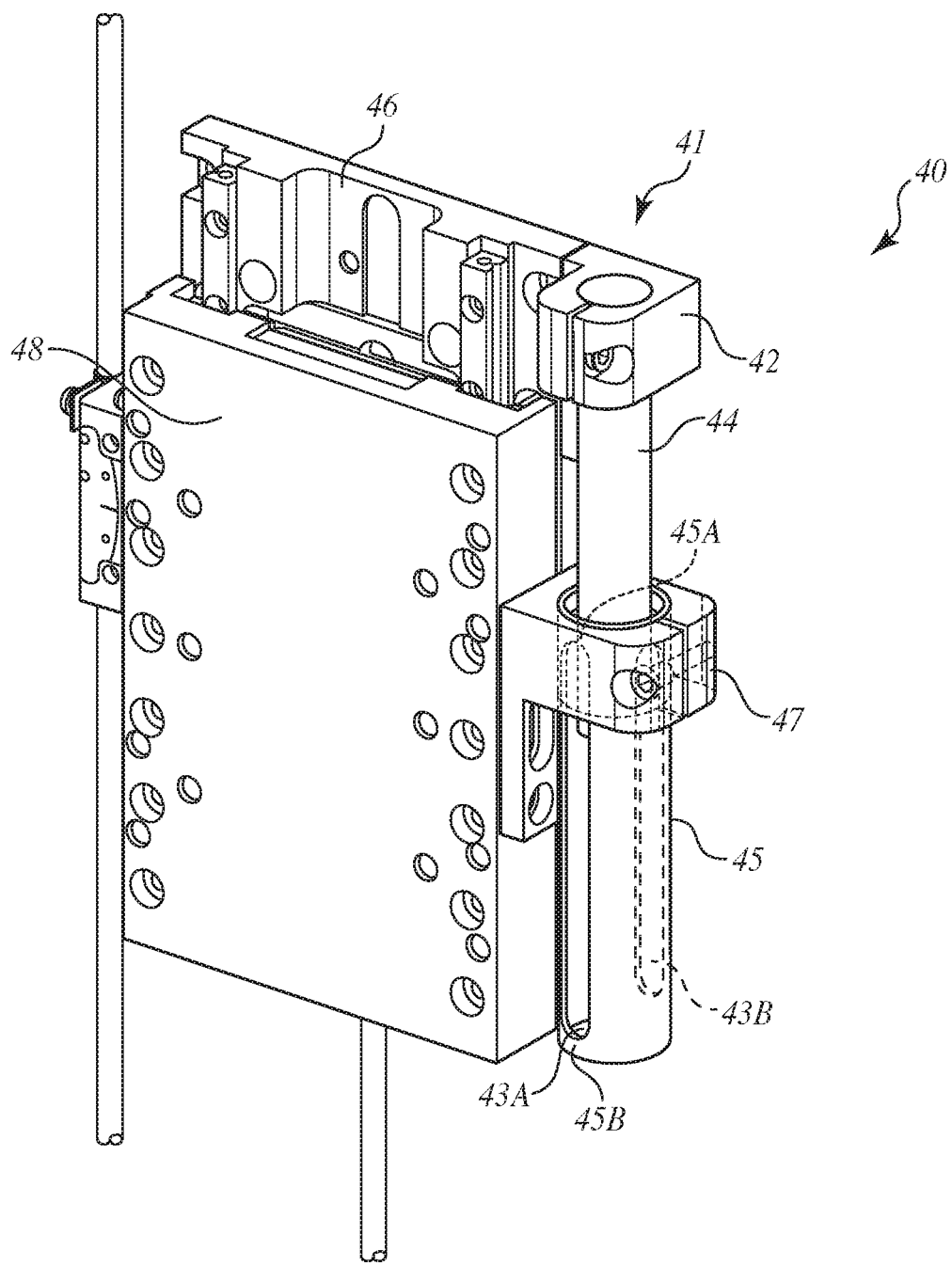
FIG. 8 shows a perspective view of the stage of FIG. 7 with the bracket made transparent for illustration purposes.

Referring to FIG. 8, stage 40 is shown with tube mount bracket 47 illustrated as transparent. This is shown to make it clear that the material tie 45A at the end of the tube 45 is used for structural integrity to enable the tube mount bracket 47 to rigidly hold the tube 45.

Figure 9:
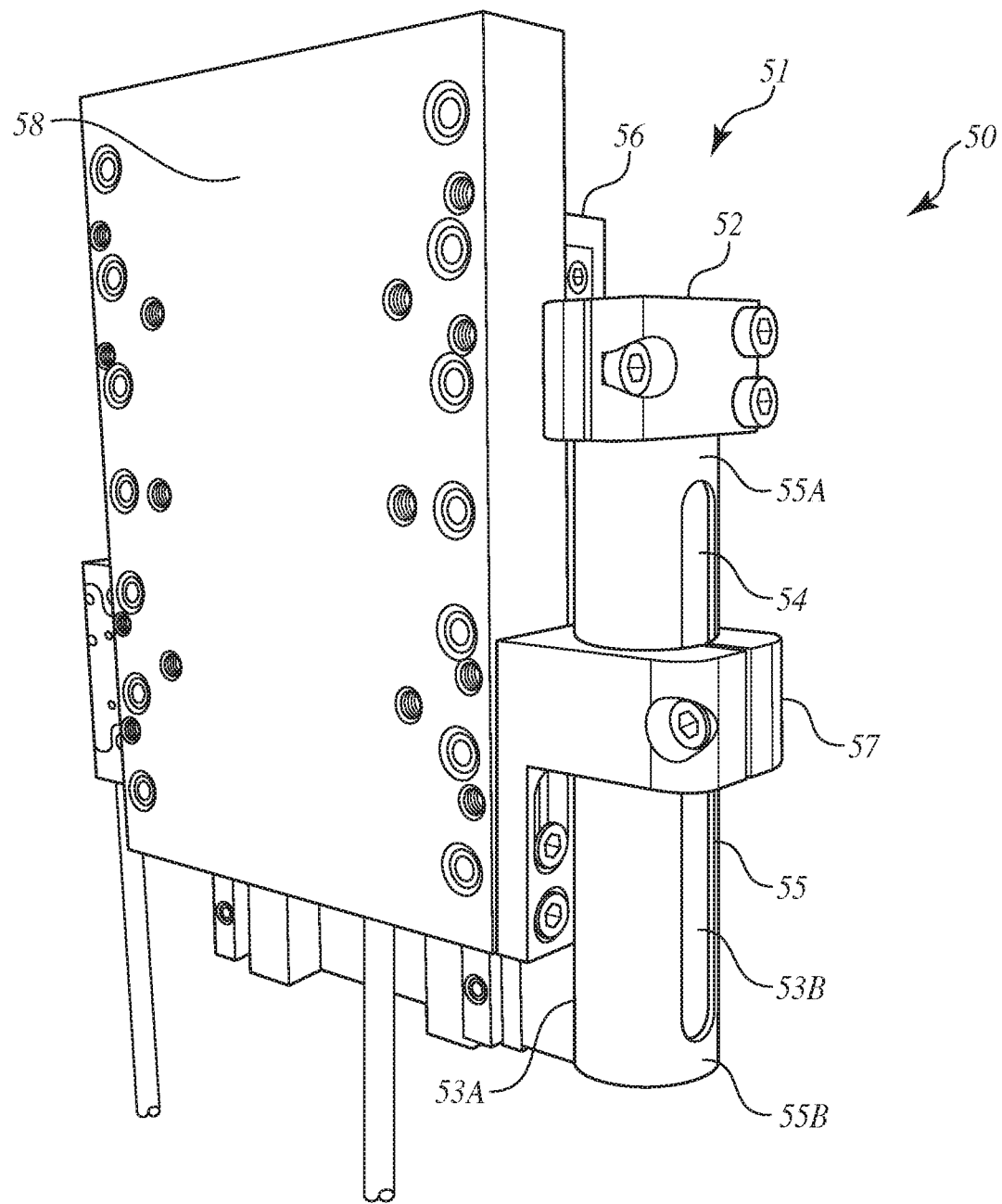
FIG. 9 shows a perspective view of a miniature linear stage having an-adjustable magnetic counterbalance assembly according to embodiments of the invention.

Referring to FIG. 9, a miniature linear stage 50 with an adjustable single magnet counter balance assembly 51 as discussed above and tested is shown. With the 90-degree rotation of tube 55, approximately a 300% variation in the counterbalance force—moving from 1 kg to 3 kg of force was achieved. Force varied progressively through rotation.

The material ties 55A, 55B at the end of the tube 55 do have an impact on linearity over the travel range of magnet 54. On a large stage (as tested above) with a 1 kg or 3 kg counterbalance the linearity is not as critical as it is on a DOF stage that needs to manage a payload of 0.25 kg. If the design can be managed such that the end of the magnet always remains in the center region of travel of the tube, then the ties are not a problem. If the magnet needs to travel close to the end of the tube, and if linearity is critical the material tie on the magnet side of the tube needs to be removed.

Figures 10A, 10B:
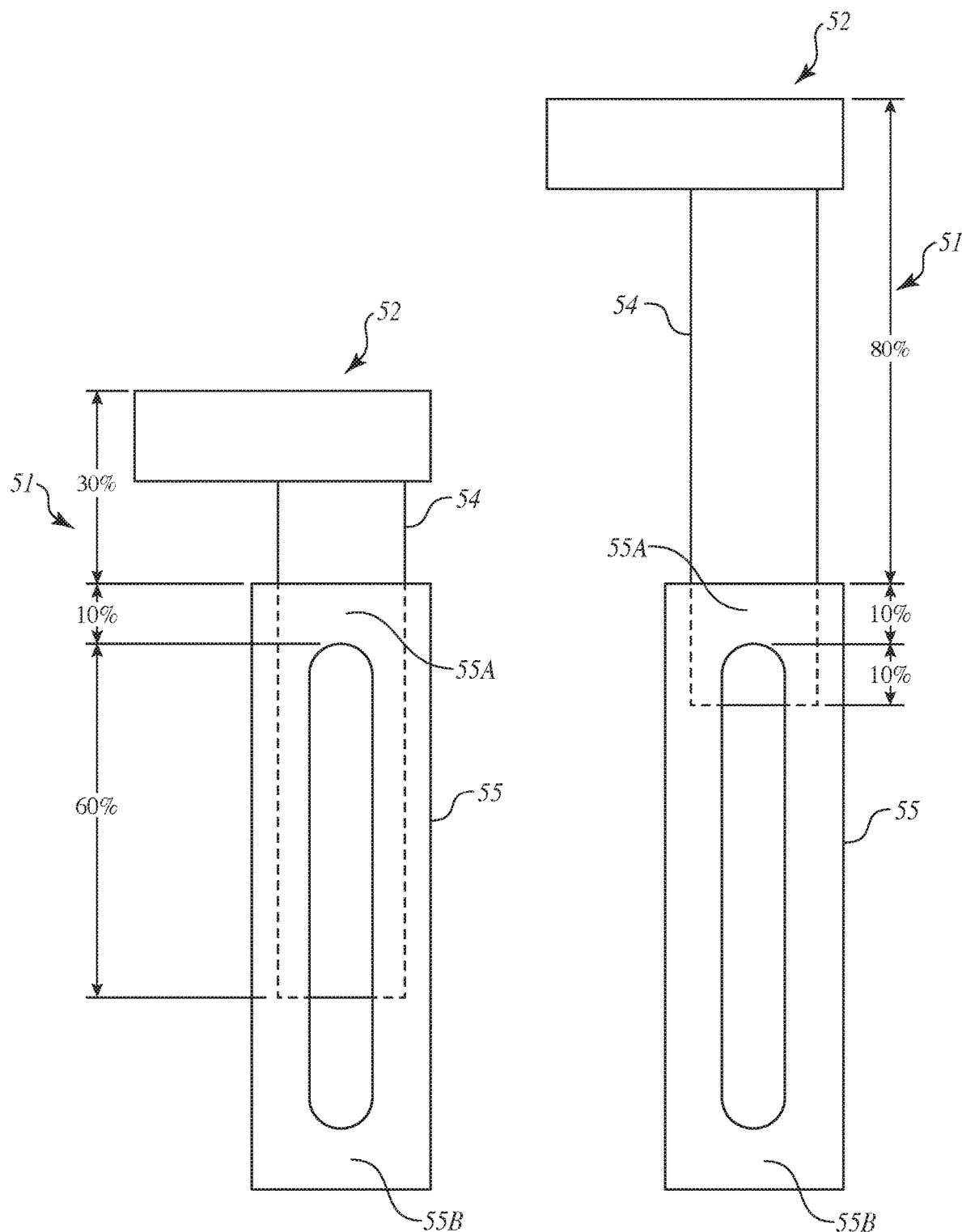
FIGS. 10A-10B show travel positions of the adjustable magnetic counterbalance assembly of the stage of FIG. 9 according to embodiments of the invention.

Referring to FIG. 10A, a magnet 54 in position A which is a constant force region of travel is shown. In position B shown in FIG. 10B, the material tie 55A starts to be approached and the force no longer becomes constant.

Figure 11:
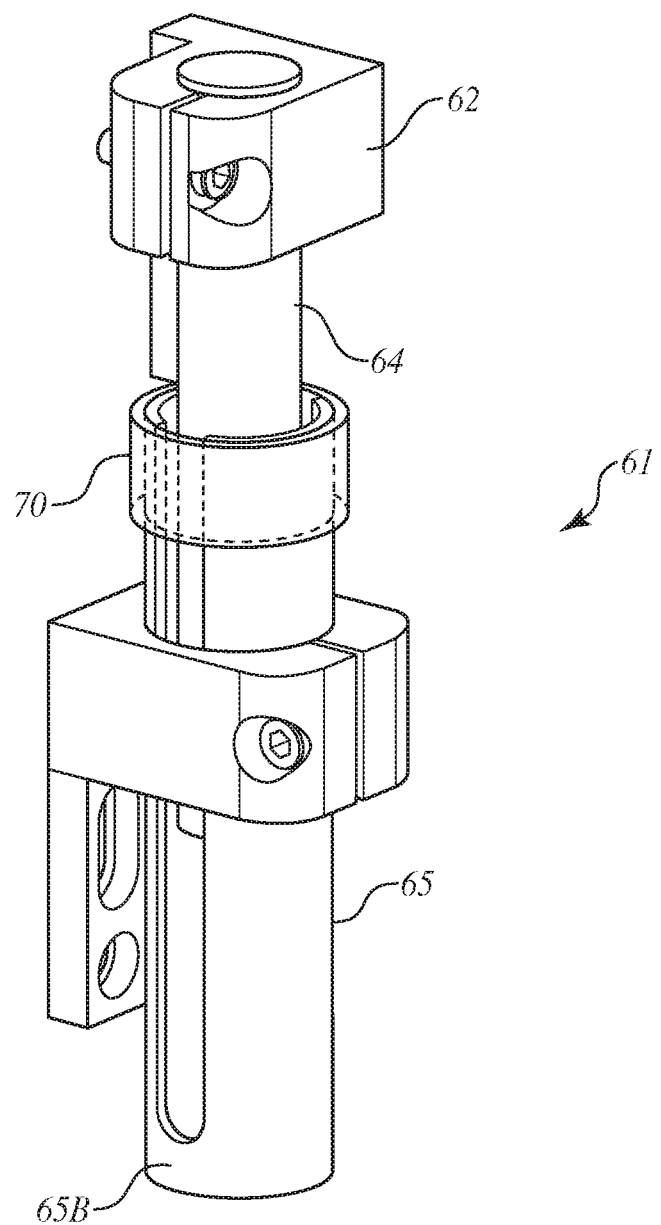
FIG. 11 shows a perspective view of an adjustable magnetic counterbalance assembly according to another embodiment.

Referring to FIG. 11, an adjustable single magnet counter balance assembly 61 having a bracket 62, magnet 64, and counterbalance tube 65 with a material tie 65B on one end and the material tie removed from the opposite end is shown. In this embodiment, the force remains constant much closer to the end of the tube. In this embodiment, there is a nonferrous collar 70 that helps to retain the mechanical integrity that is lost when the material tie is removed from tube 65.

Alternative arrangements may be used to impact the adjustability of the counterbalance; such as a plurality slots—all need to be symmetrical about a 180-degree phase; both slots and material can be of different width; and the length of the material tie can also be a factor in travel length and linearity The principles of this single magnet adjustable counterbalance can also be applied to any multi magnet counterbalance.

Although the embodiments in FIGS. 1-3 are depicted as rotating a single magnet with respect to two outer magnets, other means of adjusting the counterbalance magnetic force could also be used. For example, moving one or more magnets closer together or further apart could also be used to adjust the magnetic force.

Referring to FIGS. 12-19C, alternative embodiments are shown for linear motion stages which are movable relative to a respective base with adjustable magnetic counterbalances having at least two magnets and at least one ferromagnetic tube for changing the relative rotation or the distance between two adjacent magnets.

Referring to FIG. 12, an embodiment having a stage 78 supporting a pair of magnets 74A, 74B, and a base 76 having a pair of ferromagnetic tubes 75A. 75B disposed within is shown. Counterbalance force adjustment is made by rotating one of the magnets 74A, 74B which then may be fixed in place. In the embodiment tubes 75A, 75B are fixed and are not rotated. Referring to FIGS. 13A-13C, possible magnet orientations are shown with the position of FIG. 13A having the least counterbalance force, FIG. 13B showing an increased counterbalance force with one magnet rotated 90 degrees and FIG. 13C showing the largest force with one magnet rotated 180 degrees.

Figure 14:
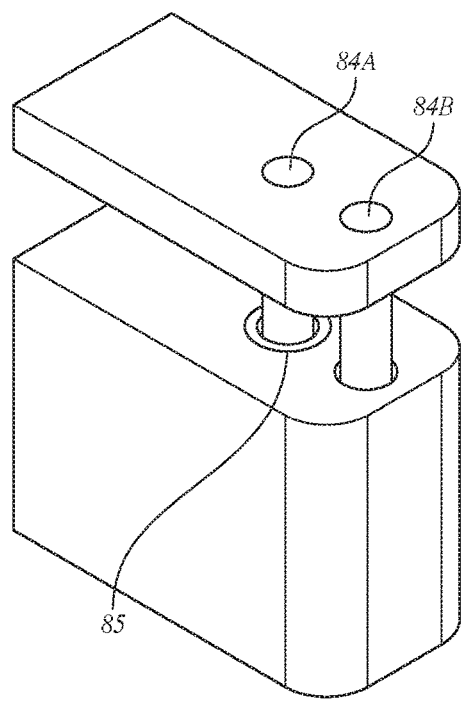
FIG. 14 shows a perspective view of a stage having and adjustable magnetic counterbalance assembly according to another embodiment.

Referring to FIG. 14, this embodiment is the same as the embodiment of FIG. 12, except only one ferromagnetic tube 85 is used. Either magnet 84A, 84B may be rotated to achieve the same force adjustability as FIG. 13.

Figure 15:
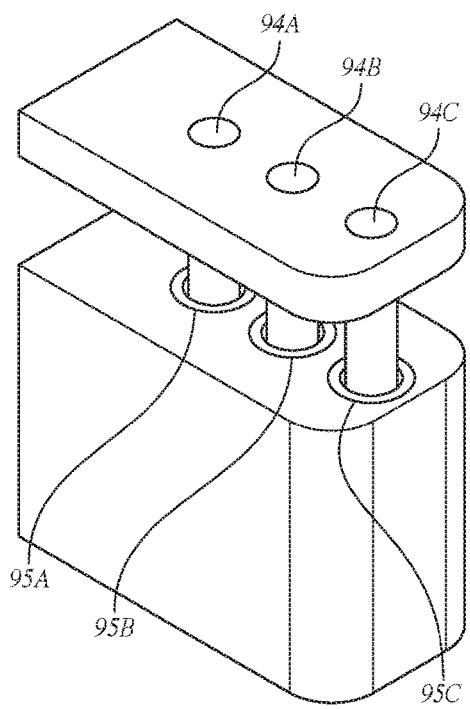
FIG. 15 shows a perspective view of a stage having and adjustable magnetic counterbalance assembly according to another embodiment.

Referring to FIG. 15, this embodiment, similar to the embodiment of FIG. 3, includes three ferromagnetic tubes 95A. 95B, 95C and three magnets 94A, 94B, 94C of which the center magnet 94B is rotationally adjustable.

Referring to FIG. 16, this embodiment includes one ferromagnetic tube 105, and two magnets 104A, 104B of which one 104B is non-cylindrical, for example, and one 104A is cylindrical wherein the cylindrical magnet 104A is disposed in the ferromagnetic tube 105 in base 106. Rotating cylindrical magnet 104A increases attractive force. In this embodiment, magnets 104A, 104B are aligned within stage 108, then fixed in place. Referring to FIGS. 17A-17C, possible magnet orientations are shown with the position of FIG. 17A having the least counterbalance force, FIG. 17B showing an increased counterbalance force with one magnet rotated 90 degrees and FIG. 17C showing the largest force with one magnet rotated 180 degrees.

Figure 18:
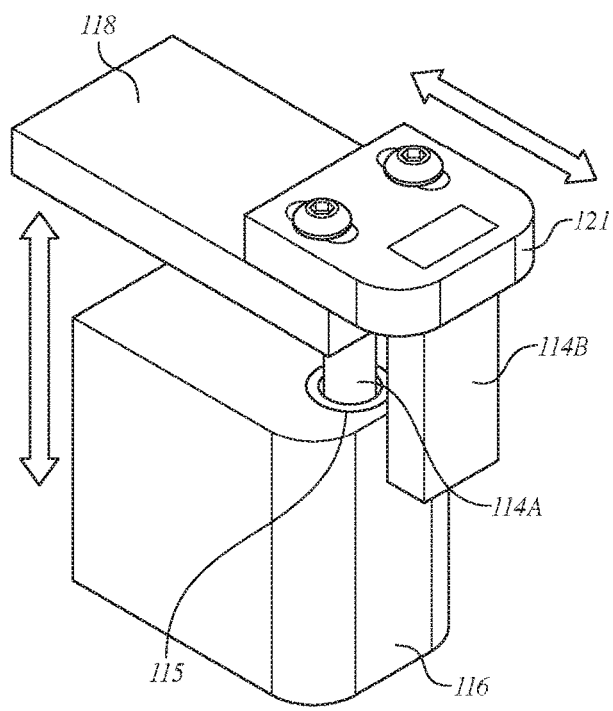
FIG. 18 shows a perspective view of a stage having and adjustable magnetic counterbalance assembly according to another embodiment.
Figure 19A:
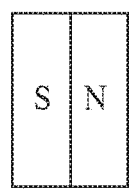
FIGS. 19A-19C show possible positions of the magnets within the adjustable magnetic counterbalance assembly of FIG. 18.
Figure 19A:
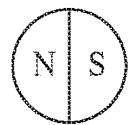
Figure 19B:
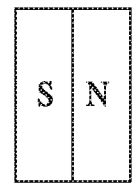
Figure 19B:
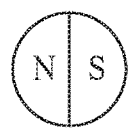
Figure 19C:
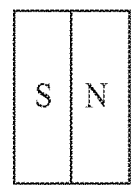
Figure 19C:
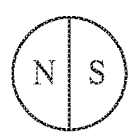

Referring to FIG. 18, this embodiment includes one ferromagnetic tube 115, and two magnets 114A, 114B of which one is non-cylindrical 114B, for example, and one 114A is cylindrical wherein the cylindrical magnet 114A is disposed in the ferromagnetic tube 115 disposed in the base 116. The non-cylindrical magnet 114B is supported by an adjustment bracket 121 attached to the stage 118 with an adjustments mechanism such as screws disposed in elongated slots. Adjusting the distance between the two magnets 114A, 114B adjusts the counterbalance force. Decreasing the distance between magnets 114A, 114B increases attractive force. Rotating the ferromagnetic tube 115 does nothing. In this embodiment, magnets 114A, 114B are aligned before assembly, then glued in place. Referring to FIGS. 19A-19C, possible magnet positions are shown with the position of FIG. 19A having the least counterbalance force with the magnets farthest apart, FIG. 19B showing an increased counterbalance force with the distance between the magnets increased and FIG. 19C showing the largest force with smallest distance between the magnets.

The ferromagnetic tubes disclosed herein may be cylindrical tubes or non-cylindrical tubes. Non-cylindrical tubes may have, for example, square cross-sections. The rotation of a square magnet within a non-cylindrical tube having a square cross-section would be limited to 0, 90 and 180 degrees.

Embodiments of the disclosure include manually adjusting the magnetic counter balance prior to use, and then securing the magnets with glue or clamps, for example. Embodiments of the disclosure also include adjusting the magnetic counter balance, after assembly with an adjustment mechanism such as the one shown in FIG. 3.

Features of the disclosed embodiments may be combined, rearranged, omitted, etc., within the scope of the invention to produce additional embodiments. Furthermore, certain features may sometimes be used to advantage without a corresponding use of other features.

Many alternatives, modifications, and variations are enabled by the present disclosure. While specific embodiments have been shown and described in detail to illustrate the application of the principles of the invention, it will be understood that the invention may be embodied otherwise without departing from such principles. Accordingly, Applicant intends to embrace all such alternatives, modifications, equivalents, and variations that are within the spirit and scope of the present invention.

What is claimed is:

1. An adjustable magnetic counterbalance assembly wherein a counterbalance force of the adjustable magnetic counterbalance is adjustable, the adjustable magnetic counterbalance assembly comprising:
   a ferromagnetic tube comprising an opening and at least one perforation;
   a first magnet disposed in the opening of the ferromagnetic tube and configured to be axially and rationally movable with respect to the ferromagnetic tube, and wherein at least one of the first or second magnets is configured to be movable relative to the other magnet;
   wherein the counterbalance force is configured to be adjustable by adjusting the positions of the magnets respective to each other.

2. The adjustable magnetic counterbalance assembly of claim 1, wherein at least one of the magnets is cylindrical.

3. The adjustable magnetic counterbalance assembly of claim 1, wherein at least one of the magnets is configured to rotate respective to the other magnet, such that the polar alignments of the magnets can be changed.

4. The adjustable magnetic counterbalance assembly of claim 1, wherein the ferromagnetic tube comprises a first ferromagnetic tube and the second magnet is disposed in a second ferromagnetic tube that is positioned parallel to the first ferromagnetic tube.

5. The adjustable magnetic counterbalance assembly of claim 1, wherein the first and second magnets are coupled to a first component of a linear motion system.

6. The adjustable magnetic counterbalance assembly of claim 5, wherein the ferromagnetic tube is coupled to a second component of a linear motion system that moves relative to the first component.

7. The adjustable magnetic counterbalance assembly of claim 1, wherein at least one of the magnets is not cylindrical.

8. The adjustable magnetic counterbalance assembly of claim 1, wherein at least one of the magnets is configured to move closer or farther from the other magnet.

9. The adjustable magnetic counterbalance assembly of claim 1, further comprising a third magnet disposed in a third ferromagnetic tube, wherein the third magnet is located between the first and second magnets, and is configured to rotate respective to the first and second magnets.

10. An adjustable magnetic counterbalance assembly comprising:
    a ferromagnetic tube comprising an opening and at least one perforation; and
    a magnet disposed in the opening of the ferromagnetic tube and configured to be axially and rotationally movable relative to the ferromagnetic tube; and
    wherein the magnetic counterbalance assembly is configured such that adjusting the rotational position between the magnet and the ferromagnetic tube changes the polar alignment of the magnet and thereby changes a magnetic counterbalance force.

11. The adjustable magnetic counterbalance assembly of claim 10, wherein the magnet is cylindrical.

12. The adjustable magnetic counterbalance assembly of claim 10, wherein the rotational position is adjusted by rotating the magnet.

13. The adjustable magnetic counterbalance assembly of claim 10, wherein the rotational position is adjusted by rotating the ferromagnetic tube.

14. The adjustable magnetic counterbalance assembly of claim 10, wherein the magnet is coupled to a first component of a linear motion system.

15. The adjustable magnetic counterbalance assembly of claim 14, wherein the ferromagnetic tube is coupled to a second component of a linear motion system that moves relative to the first component.

16. The adjustable magnetic counterbalance assembly of claim 10, wherein the ferromagnetic tube is disposed in a moving table of a linear motion system.

17. The adjustable magnetic counterbalance assembly of claim 10, wherein the perforation comprises a slot in the ferromagnetic tube.

18. The adjustable magnetic counterbalance assembly of claim 10, wherein the perforation comprises a pair of slots in the ferromagnetic tube.

* * * * *